E. A. LELAND.
PIPE AND HOSE-COUPLING.
No. 173,307. Patented Feb. 8, 1876.
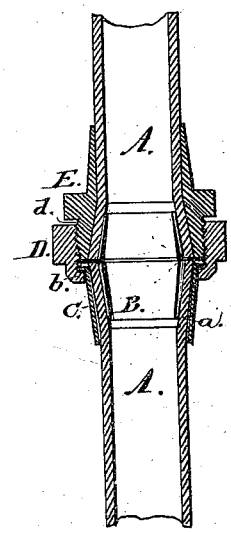

UNITED STATES PATENT OFFICE.

EDWIN A. LELAND, OF NEW YORK, ASSIGNOR OF ONE-HALF HIS RIGHT TO LEONARD RICHARDSON, OF BROOKLYN, N. Y.

IMPROVEMENT IN PIPE AND HOSE COUPLINGS.

Specification forming part of Letters Patent No. 173,307, dated February 8, 1876; application filed January 10, 1876.

*To all whom it may concern:*

Be it known that I, EDWIN A. LELAND, of the city, county, and State of New York, have invented an Improvement in Pipe and Hose Couplings, of which the following is a specification:

This invention is more particularly designed for joining sections of lead pipe with a "butt-joint," so termed, without the "wiping" commonly resorted to for such purpose, the invention, however, being capable of advantageous use in the joining of lengths of hose, &c.

The invention comprises the combination of a thin internal bracing-thimble, made in one or two parts, as may be preferred, with a "pipe-coupling," commonly so termed, differing from those in ordinary use in having its bore made tapering in opposite directions, in order, when in use, to fit the enlarged ends of the sections or lengths to be joined. By this means the result aforesaid is effectually secured at a very moderate expense, and with the outlay of comparatively little time and skill.

The drawing represents a central longitudinal sectional view of a pipe and hose coupling made according to my invention.

A A indicate the two sections or lengths of pipe to be joined by a butt-joint—that is to say, with their adjacent ends brought square against each other. Where the sections or lengths are of lead pipe the aforesaid adjacent ends are, preliminary to joining, enlarged to the tapering form shown at $a$ by the use of an appropriate tapering implement. B is the internal bracing-thimble, which is made of thin metal, such as sheet-brass. This internal thimble is of a form tapering toward each end, its ends having a diameter corresponding to the internal diameter of the pipe-sections to be joined; its middle, a diameter corresponding to that of the flaring ends $a$ of said sections.

It will be observed that this thimble, being of thin or sheet metal, occupies so small a space as not to materially interfere with the uniformity of bore through or between the two sections to be joined, and that, being circular in its cross-section, it is capable of withstanding almost any degree of inward pressure exerted uniformly around or upon its circumference. In joining the two sections A A this internal thimble B is inserted within their flaring ends $a$, and the said ends are then brought over the thimble and butted or brought square against each other. Upon one of the said flaring ends $a$ is placed a tapering washer or collar, C, which has upon its larger or inner end a circumferential flange or stop, $b$. Upon this washer C is placed the internally-threaded nut D, which is kept from passing off from the said washer by bearing against the flange $b$, or, when preferred, by having its hub $c$ fitted to the tapering exterior of the washer C. E is an externally-threaded nut, the hub $d$ of which is fitted upon the flaring exterior of the adjacent end of the other section A, the nut E being by this means kept from being pulled off from the said end.

It will be seen that by screwing the nut D upon the nut E the two adjacent ends of the sections will be drawn snugly toward and butted against each other, the internal thimble B preventing the inward yielding of the soft metal or material of the pipe, which, if not thus internally braced and supported, would "give" to the strain exerted thereon and slip from the nuts, thereby disconnecting or preventing the connection of the two sections A A. It is this combination of the internal thimble, thin and constructed to sustain the metal or material of the pipe against yielding to the strain exerted by the nuts when drawn together, that forms the essential principle of my invention.

When desired, the internal thimble aforesaid, instead of being made in a single piece, as hereinbefore described, may be formed in two sections, each section being fitted into the flaring end of one of the pipe-sections or lengths A A, and the outer or larger end of each said section of the thimble butting against the adjacent end of the other of said sections of said thimble.

It will be understood that, the function of this thimble being simply to resist the inward pressure of the two nuts upon the pipe, radial strength only is required in the aforesaid thimble, it being subjected to no longitudinal strain.

It will also be observed that this invention may be applied to joining lengths of hose made of india-rubber or other suitable material; but in this case no previous flaring of the ends to be joined is necessary, the yielding nature of the material enabling it to accommodate itself to the tapering contour of the internal thimble, and the coincident shape of the washer, and the hub of the externally-threaded nut.

It will also be observed that the nuts D E and washer C differ from the corresponding parts of the ordinary pipe-coupling only in their construction to fit the flaring end of the pipe-sections, the washer enabling the nuts to be turned with reference to each other, in order that the one may be screwed into the other, as hereinbefore set forth.

What I claim as my invention is—

The internal bracing-thimble B, in combination with the "coupling," so termed, comprising the nuts D E and tapering washer C, substantially as and for the purpose herein set forth.

EDWIN A. LELAND.

Witnesses:
 JAMES A. WHITNEY,
 A. H. BRADLEY.